US011979823B2

(12) United States Patent
Jeong et al.

(10) Patent No.: US 11,979,823 B2
(45) Date of Patent: May 7, 2024

(54) METHOD AND DEVICE FOR SUPPORTING NETWORK SLICE UPON NETWORK INTERWORKING

(71) Applicant: Samsung Electronics Co., Ltd., Suwon-si (KR)

(72) Inventors: Sangsoo Jeong, Suwon-si (KR); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 17/486,073

(22) Filed: Sep. 27, 2021

(65) Prior Publication Data
US 2022/0104115 A1    Mar. 31, 2022

(30) Foreign Application Priority Data

Sep. 28, 2020   (KR) ........................ 10-2020-0126050

(51) Int. Cl.
*H04W 48/18* (2009.01)
*H04W 48/06* (2009.01)
*H04L 101/375* (2022.01)

(52) U.S. Cl.
CPC ........... *H04W 48/18* (2013.01); *H04W 48/06* (2013.01); *H04L 2101/375* (2022.05)

(58) Field of Classification Search
CPC ..... H04W 48/18; H04W 48/06; H04W 88/16; H04W 48/02; H04W 76/10; H04W 80/10; H04W 88/02; H04L 2101/375
USPC ........................................................ 370/329
See application file for complete search history.

(56) References Cited

U.S. PATENT DOCUMENTS

2013/0303114 A1    11/2013  Ahmad et al.
2015/0098321 A1     4/2015  Jeong et al.
2021/0211974 A1*    7/2021  Prabhakar ........... H04W 84/042

FOREIGN PATENT DOCUMENTS

KR   10-2022-0015350 A1    2/2022

OTHER PUBLICATIONS

Samsung, 'KI #6, New Sol: Interworking support', S2-2005524, 3GPP TSG SA WG2 #140E, Aug. 13, 2020, pp. 1-4.
Nec, 'Update to Solution #2 Max number of UEs per Network Slice control at registration', S2-2000317, 3GPP TSG SA WG2 #136-AH, Jan. 7, 2020, pp. 1-6.

(Continued)

*Primary Examiner* — Huy C Ho
(74) *Attorney, Agent, or Firm* — Jefferson IP Law, LLP

(57) ABSTRACT

The disclosure relates to a pre-5th-Generation (5G) or 5G communication system to be provided for supporting higher data rates Beyond 4th-Generation (4G) communication system such as Long Term Evolution (LTE). A method for processing a network slice by a packet data network gateway control plane (PGW-C) in a wireless communication system is provided. The method includes receiving a session create request message from a mobility management entity (MME), identifying whether information indicating that a user equipment (UE) supports a slice quota-based operation is included in the session create request message, and transmitting, to the MME, a session create response message configured based on a result of the identification.

10 Claims, 7 Drawing Sheets

(56) References Cited

OTHER PUBLICATIONS

Huawei et al., 'Solution of Key Issue #2: Support of network slice related quota on the maximum number of PDU sessions', S2-2000629, 3GPP TSG SA WG2 #136-AH, Jan. 7, 2020, pp. 1-5.
International Search Report and Written Opinion dated Jan. 7, 2022, issued in International Patent Application No. PCT/KR2021/013242.
3GPP, TSG SA, Procedures for the 5G System (5GS), Stage 2 (Release 16), XP051960894, 3GPP TS 23.502 V16.6.0 Sep. 2020.
3GPP, TSG SA, Study on enhancement of network slicing, Phase 2 (Release 17), XP051925995, 3GPP TR 23.700-40 V1.0.0, Sep. 2020.
China Mobile, KI#2, Solution 6.6 updates with considering EPS/5GS interworking, S2-2005211, 3GPP TSG-SA WG2 Meeting #140#, Aug. 2020.
Extended European Search Report dated Mar. 26, 2024, issued in European Application No. 21873013.3-1216.

* cited by examiner

METHOD AND DEVICE FOR SUPPORTING NETWORK SLICE UPON NETWORK INTERWORKING

CROSS-REFERENCE TO RELATED APPLICATION(S)

This application is based on and claims priority under 35 U.S.C. § 119(a) of a Korean patent application number 10-2020-0126050, filed on Sep. 28, 2020, in the Korean Intellectual Property Office, the disclosure of which is incorporated by reference herein in its entirety.

BACKGROUND

1. Field

The disclosure relates to network slicing technology applicable to various network structures.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, network slicing technology has been introduced to support a diversity of services in various network structures. Network slicing is technology for logically configuring a network with a set of network functions (NFs) to support a specific service and separating it from other slices. One UE may access two or more slices when receiving various services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for processing signaling related to network slicing between a user equipment (UE) and a network during network interworking in various network structures.

Additional aspects will be set forth in part in the description which follows and, in part, will be apparent from the description, or may be learned by practice of the presented embodiments.

In accordance with an aspect of the disclosure, a method for processing a network slice by a packet data network gateway control plane (PGW-C) in a wireless communication system is provided. The method includes receiving a session create request message from a mobility management entity (MME), identifying whether information indicating that a user equipment (UE) supports a slice quota-based operation is included in the session create request message, and transmitting, to the MME, a session create response message configured based on a result of the identification.

According to an embodiment, when the session create request message includes the information indicating that the UE supports the slice quota-based operation, the session create response message may include at least one of information indicating that a session create request from the UE is rejected and a cause is a lack due to the slice quota, a back-off timer value to be applied by the UE, inaccessible single network slice selection assistance information (S-NSSAI), and a target access point name (APN).

According to an embodiment, when the session create request message does not include the information indicating that the UE supports the slice quota-based operation, the session create response message may include at least one of information indicating that a session create request from the UE is rejected and a cause is a congested state of a PGW, a timer value, congestion level information, and one or more target APNs.

In accordance with another aspect of the disclosure, a method for processing a network slice by a UE in a wireless communication system is provided. The method includes identifying whether the UE supports slice quota-based operation, transmitting a packet data network (PDN) connection request message for accessing a 4th-generation (4G) network to an MME based on a result of the identification, and receiving, from the MME, a PDN connection reject message configured in response to the PDN connection request message.

According to an embodiment, when the PDN connection request message includes information indicating that the UE supports the slice quota-based operation, the PDN connection reject message may include at least one of information indicating that a session create request from the UE is rejected and a cause is a lack due to the slice quota, a back-off timer value to be applied by the UE, inaccessible single network slice selection assistance information (S-NSSAI), and a target access point name (APN).

According to an embodiment, when the PDN connection request message does not include information indicating that the UE supports the slice quota-based operation, the PDN connection reject message includes at least one of information indicating that a session create request from the UE is rejected and a cause is a congested state of a PGW, a timer value, congestion level information, and one or more target APNs.

In accordance with another aspect of the disclosure, a PGW-C configured to process a network slice in a wireless communication system is provided. The PGW-C includes a transceiver and a controller coupled with the transceiver and configured to configured to receive a session create request message from an MME, identify whether information indicating that a UE supports a slice quota-based operation is included in the session create request message, and transmit, to the MME, a session create response message configured based on a result of the identification.

In accordance with another aspect of the disclosure, a UE configured to process a network slice in a wireless communication system is provided. The UE includes a transceiver and a controller coupled with the transceiver and configured to control to identify whether the UE supports slice quota-based operation, transmit a packet data network (PDN) connection request message for accessing a 4th-generation (4G) network to an MME based on a result of the identification, and receive, from the MME, a PDN connection reject message configured in response to the PDN connection request message.

The disclosure may efficiently process network slicing upon network interworking in various network structures.

The disclosure may efficiently restrict a UE's access to a slice in a network considering the network slice quota-based operation capability of the UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
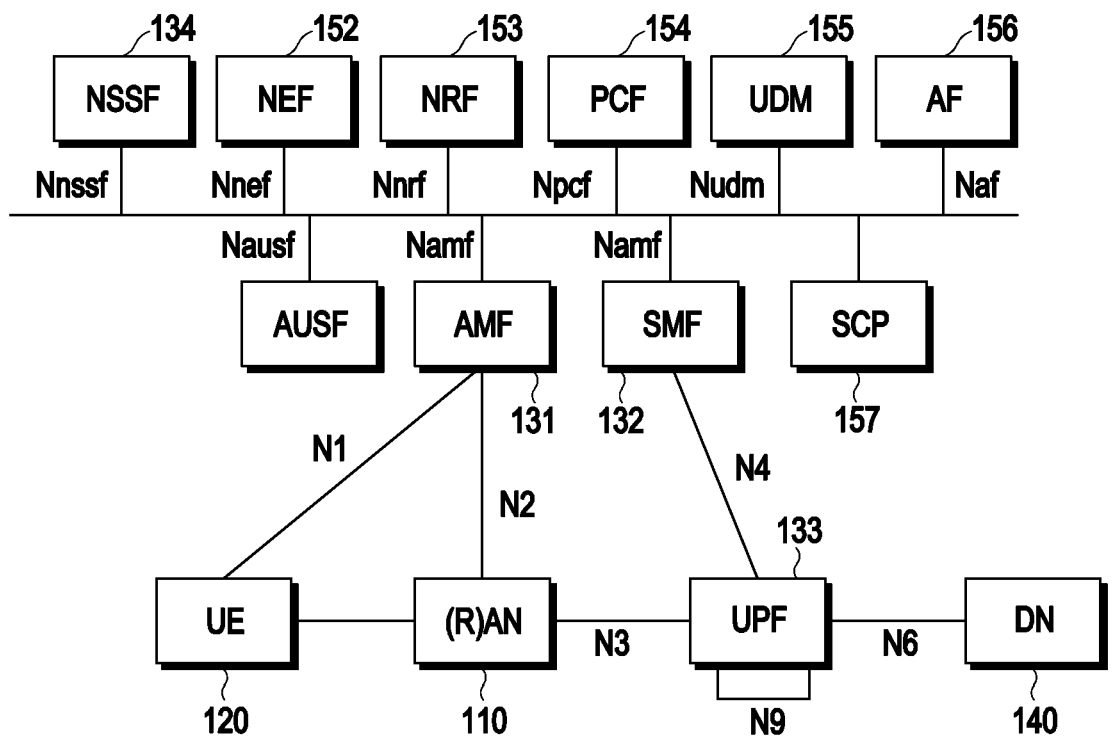
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

The terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Methods described below in connection with embodiments are based on hardware. However, embodiments of the disclosure encompass technology using both hardware and software and thus do not exclude software-based methods.

The disclosure relates to a method and device for supporting various services in a wireless communication system. Specifically, the disclosure describes a technique for supporting various services by supporting mobility of a UE in a wireless communication system.

As used herein, terms for identifying access nodes, terms denoting network entities or network functions (NFs), terms denoting messages, terms denoting inter-network entity interfaces, and terms denoting various pieces of identification information are provided as an example for ease of description. Thus, the disclosure is not limited by the terms, and such terms may be replaced with other terms denoting objects with equivalent technical concept.

For ease of description, the disclosure adopts terms and names defined in the 3GPP long-term evolution (LTE) and 5-generation (5G) standards. However, the disclosure is not limited by such terms and names and may be likewise applicable to systems conforming to other standards.

Hereinafter, for convenience of description, entities for exchanging information for access control and state management will be collectively referred to as NFs. An NF may be at least one of, e.g., an access and mobility management function (AMF) device, a session management function (SMF) device, or a network slice selection function (NSSF) device. However, the embodiments of the disclosure may be likewise applied even when the NF is actually implemented as an instance (e.g., an AMF instance, SMF Instance, or NSSF Instance).

In the disclosure, instance may refer to a state in which a specific NF exists in the form of a software code and is executable by being assigned a physical or/and logical resource from a physical computing system, e.g., a specific computing system present on a core network, to perform the function of the NF. Therefore, AMF instance, SMF instance, and NSSF instance may mean when a physical and/or logical resource is assigned from a specific computing system present on a core network to perform the AMF, SMF, and NSSF operation, respectively. As a result, the AMF instance, SMF instance, and NSSF instance which receive and use a physical and/or logical resource from a specific computing system present on a network may perform the same operations as when there a physical AMF, SMF, and NSSF device exists.

Therefore, in describing embodiments of the disclosure, NF (AMF, SMF, UPF, NSSF, NRF, or SCP) may be replaced with NF instance or, conversely, NF instance may be replaced with NF. Similarly, in describing embodiments of the disclosure, NW slice may be replaced with NW slice instance, or NW slice instance may be replaced with NW slice.

FIG. 1 illustrates a wireless communication system according to an embodiment of the disclosure.

Referring to FIG. 1, FIG. 1 illustrates a radio access node (RAN) 110 and a user equipment (UE) 120 as some of nodes using a radio channel in a wireless communication system.

Although FIG. 1 illustrates only one base station (e.g., RAN 110) and one UE 120, other base stations identical to or similar to the base station (e.g., RAN 110) may be further included in the wireless communication system. Further, although FIG. 1 illustrates a case where only one UE 120 communicates with one base station (e.g., RAN 110), it is obvious that a plurality of UEs may communicate with one base station (e.g., RAN 110).

The base station (e.g., RAN 110) is a network infrastructure that provides the UE 120 with radio access. The base station (e.g., RAN 110) has a coverage defined as a certain geographic area based on a distance within which it may transmit signals (not shown in FIG. 1). The base station (e.g., RAN 110) may be denoted in other terms, such as an 'access point (AP)', an 'eNodeB (eNB)', a '5th generation (5G) node', a 'wireless point', or a 'transmission/reception point (TRP)' or in other various terms with an equivalent technical meaning thereto.

The UE 120 is a device used by the user and performs communication with the base station (e.g., RAN 110) through a radio channel. In some cases, the UE 120 may be operated without the user's involvement.

For example, the UE 120 may be a machine-type communication (MTC) device which may not be carried by the user. The UE 120 illustrated in FIG. 1 may include at least one portable user device and may include at least one MTC.

The UE 120 of FIG. 1 may also be denoted in other terms, such as a 'terminal, a 'mobile station', a 'subscriber station', a 'remote terminal', a 'wireless terminal' or a 'user device' or in other various terms with equivalent technical meanings thereto.

The AMF device 131 may be a network entity that manages wireless network access and mobility for the UE 120.

The SMF device 132 may be a network entity that manages a connection of a packet data network for providing packet data to the UE 120. The connection between the UE 120 and the SMF 132 may be a PDU session.

The user plane function (hereinafter referred to as a UPF) device 133 may be a gateway for transferring packets transmitted/received by the UE 120 or a network entity serving as a gateway. The UPF 133 may be connected to a data network (DN) 140 connected to the Internet and may provide a path for data transmission/reception between the UE 120 and the DN 140. Accordingly, the UPF 133 may route data, to be transferred to the Internet among packets transmitted by the UE 120, to the Internet data network.

The network slice selection function (NSSF) device 134 may be a network entity that performs a network selection operation described in the disclosure, e.g., an operation for selecting a network slice. The operation of the NSSF device 134 is described below in more detail with reference to the drawings.

The authentication server function (AUSF) device 151 may be a device (network entity) that provides a service for processing subscriber authentication.

The network exposure function (NEF) device 152 may be a network entity that is able to access information for managing the UE 120 in the 5G network and transmit the UE's subscription to the mobility management event, the UE's subscription to the session management event, a request for session-related information, the UE's billing information settings, a request for changing the PDU session policy for the UE, and small data for the UE.

The network repository function (NRF) device 153 may be a network entity that may store state information for NFs and may process a request for finding an NF which may be accessed by other NFs.

The policy and charging function (hereinafter referred to as a PCF) device 154 may be a network entity that applies the mobile communication operator's service policy, billing policy, and PDU session policy for the UE 120.

The unified data management (UDM) device 155 may be a network entity that stores information about subscribers and/or the UE 120.

The application function (AF) device 156 may be a network entity having a function of providing a service to users in conjunction with a mobile communication network.

The service communication proxy (SCP) device 157 is a network entity that provides functions, such as NF discovery and message transfer between NFs for communication between NFs. The SCP 157 may operate in a form integrated with the NRF 153 according to the operator's selection, and in this case, the SCP 157 may include the functions of the NRF 153 or, conversely, the NRF 153 may include the functions of the SCP 157.

The AMF device 131, the SMF device 132, the UPF device 133, the NSSF device 134, the AUSF device 151, the NEF device 152, the NRF device 153, the PCF device 154, the UDM device 155, the AF device 156, and the SCP device 157 may be at least one or more devices and/or be implemented in the form of software or firmware running on the system. Further, the devices 131, 132, 133, 134, 151, 152, 153, 154, 155, 156, and 157 may be implemented in hardware form if necessary.

In the following description, the term "device" may be deleted for convenience of description. For example, AMF device 131 may be simply referred to as AMF 131, and SMF device 132 may be simply referred to as SMF 132.

Meanwhile, in FIG. 1, the denotations next to the lines between the network entities, the UE 120 and the RAN 110 may refer to the interfaces for the entities. For example, an N1 interface may be used between the UE 120 and the AMF 131, an N2 interface may be used between the RAN 110 and the AMF 131, and an N3 interface may be used between the RAN 110 and the UPF 133. Similarly, an N4 interface may be used between the SMF 132 and the UPF 133, an N9 interface may be used between or inside the UPFs 133, and an N6 interface may be used between the UPF 133 and the DN 140.

Figure 2:
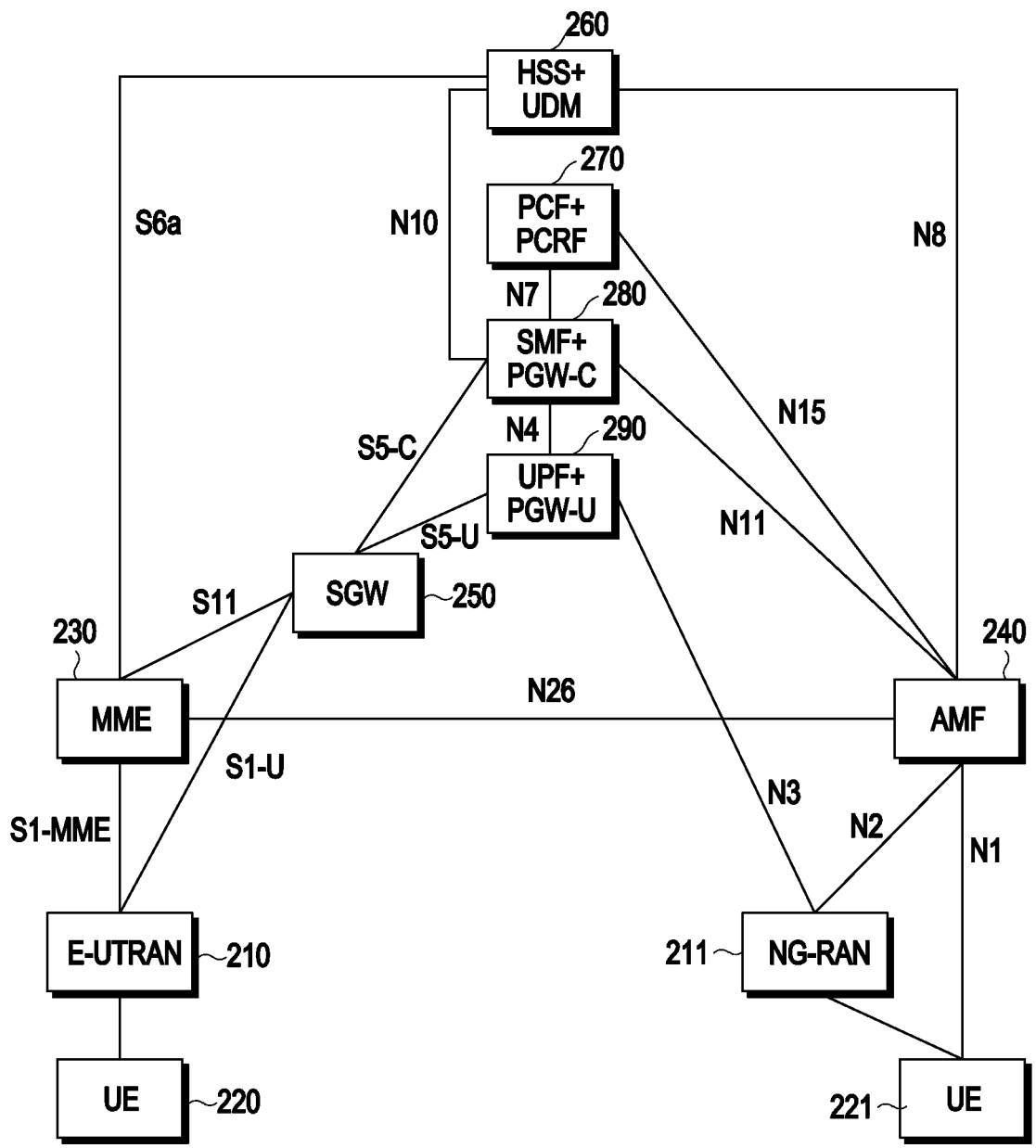
FIG. 2 is a view illustrating a network structure for providing a service via interworking between a 5G communication system and a 4G (or LTE) communication system according to an embodiment of the disclosure.

FIG. 2 is a view illustrating a network structure for providing a service via interworking between a 5G communication system and a 4G (or LTE) communication system according to an embodiment of the disclosure.

Referring to FIG. 2, networks for providing services by interworking between a 5G communication system and a 4G (or LTE) communication system may include an E-UTRAN 210, an NG-RAN 211, UEs 220 and 221, an MME 230, an AMF 240, an SGW 250, HSS+UDM 260, PCF+PCRF 270, SMF+PGW-C 280, and UPF+PGW-U 290.

Here, HSS+UDM 260, PCF+PCRF 270, SMF+PGW-C 280, and UPF+PGW-U 290 each may denote a 4G entity and a 5G entity that perform the same or similar functions to provide a 4G (or LTE) communication service and a 5G communication service to the UEs 220 and 221.

For control for the same subscriber, the unified data management (UDM) and home subscriber subsystem (HSS) need to interwork with each other. To support session continuity (IP address maintenance), the SMF/UPF needs to support the function of PGW. Further, the MME, which is a node for mobility management in the 4G network and the AMF may exchange information for supporting UE mobility between 5G and 4G through the N26 interface.

A communication system (including a UE, a base station, and a core) of the disclosure may operate based on network slices. A network slice may be viewed as a logically separated network and may be composed of a set of NFs to support network functions.

If the network is operated based on network slices, the network may be operated with a different capacity, configuration, and policy for each network slice. In the disclosure, a quota may be introduced for each network slice. The quota may include the maximum number of UEs that may simultaneously access a slice, the maximum number of sessions (PDU session or PDN connection) that may be created simultaneously, and the maximum data rate that the subscriber may use for each slice. However, without limitations thereto, the quota may include other types of parameters necessary for network operation, and the gist, operation, and configuration of the disclosure may be expanded targeting them.

If network slicing is used, interworking between a 5G network that explicitly supports the concept of network slice through standardized protocols and operations and a 4G network that does not explicitly support a network slice needs to be considered.

In particular, as described above, if all or some of the network functions (NFs) are shared to ensure service continuity between the 5G network and the 4G network, the slice quota should be applicable not only for 5G access but also for 4G access and should be considered even in the situation where the UE moves between 5G and 4G. This operation may be selectively applied to the user who subscribed to a 5G service using a 5G-supportable UE.

If the operator operating the communication system provides a service using a network slice in interworking between a 5G network and a 4G network, a 5G system that supports detailed operations considering network slicing and a 4G system with only a minimum function to help use the network slicing function upon movement to 5G coexist.

In a communication system, a network slice may be operated considering a quota. The quota may be expressed as the number of UEs that may simultaneously access a specific network slice, the number of connections (PDU sessions or PDN connections) that may be created at the same time, or the upper limit of the maximum transmission rate that may be provided at the same time. For example, if a specific slice is operated with the maximum number of connected UEs as a quota, the communication system may perform control such that the number of UEs is limited to less than or equal to the quota.

If multiple NFs or NF instances belong to one network slice, an NF having a slice quota management function that manages quotas in slice units is required. Slice quota management may include an operation for receiving and collecting the current states of the network slice from NFs or NF instances and comparing the with the quota to make a decision and an additional function for the same and may be defined as a separate NF and NF service having only a slice quota management function or may be defined as adding the corresponding function to an existing NF (e.g., PCF, NSSF, NRF, or UDM).

Such quota-based access control or detailed operations may be used only when supported by the network (base station expressed as NG-RAN and NFs inside the core) and the UE. If a UE (e.g., 5G UE) having control capability considering slice quota and a UE (e.g., 4G UE) that does not support control capability considering slice quota coexist in the network, control considering the capability level of the UE is needed. If one UE supports both 5G and 4G, the above example may be expressed as having quota control capability when the UE operates in 5G mode and as not having quota control capability when the UE operates in 4G mode.

Figure 3:
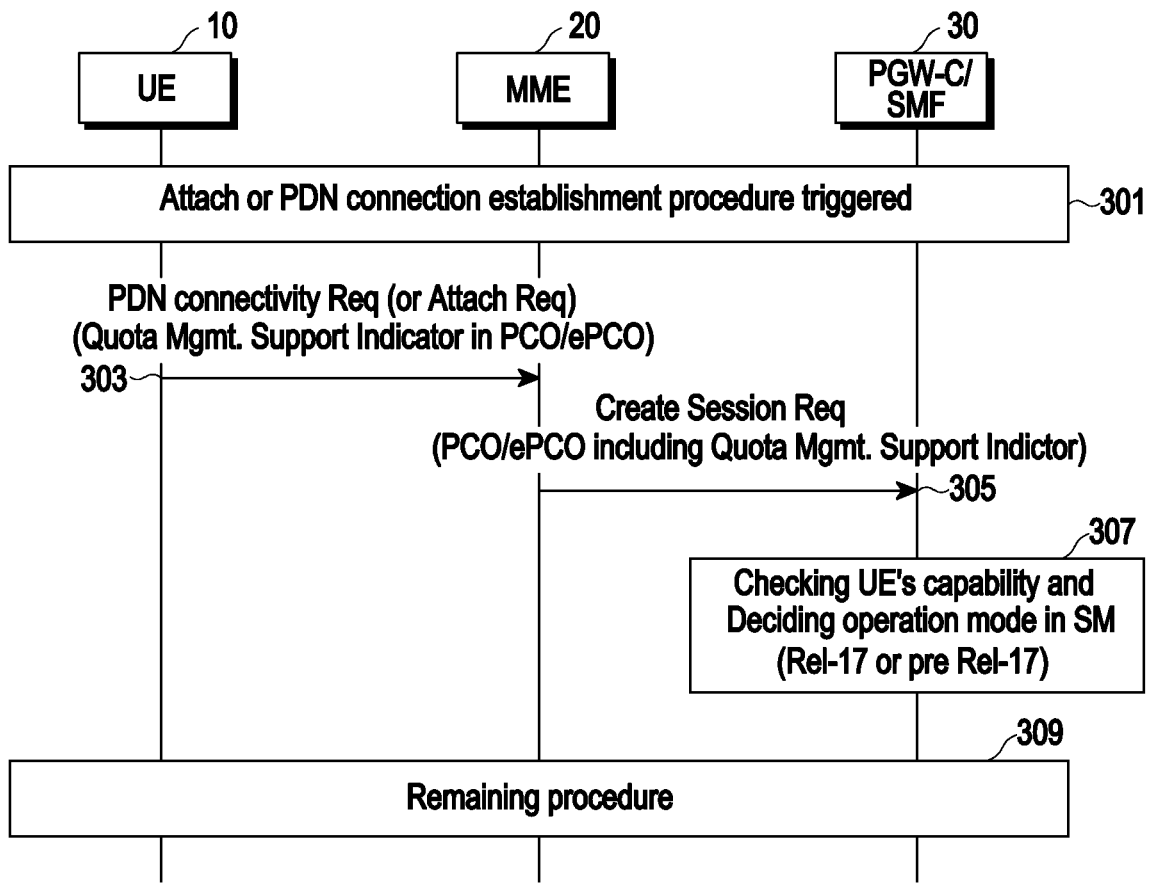
FIG. 3 illustrates operations of a UE when accessing a 4G network according to an embodiment of the disclosure.

FIG. 3 illustrates operations of a UE when accessing a 4G network according to an embodiment of the disclosure.

Referring to FIG. 3, a wireless communication system according to an embodiment may include a UE 10, an MME 20, and a PGW-C/SMF 30.

In operation 301, an attach or PDN connection establishment procedure may be triggered between the UE 10, the MME 20, and the PGW-C/SMF 30. In this case, the UE 10 may be in a state in which a condition for accessing the 4G network has been met.

In operation 303, the UE 10 may transmit a request message (PDN connectivity Req (or Attach Req)) for accessing (creating a session or PDN connection) or registering in the 4G network to the MME 20. The request message for creating a new PDN connection may include information (e.g., APN) indicating a target service and may include information indicating that the UE 10 supports operations considering the slice quota.

Here, the operations of the UE 10 considering the slice quota include an operation of understanding and using information (a timer value for limiting access, a value indicating a cause) that the network transfers to the UE when access to the slice is impossible due to the quota. The information may be transferred as a separate information element included in the PDN connection establishment request or as detailed information for one of protocol configuration options (PCO), ePCO, and APCO.

In the process of establishing a PDN connection among the attach processes, a PDN connection create request may be included in the attach message. Or, it may be included as one of the IEs for transferring the UE capability of the attach request message that the UE 10 transfers to the MME 20 during the attach process.

If the request message for creating a new PDN connection does not include information indicating that the UE 10 supports an operation considering the slice quota, it may be considered that the UE 10 does not support the corresponding function. Further, the UE 10 may explicitly indicate, in the corresponding field, that the UE 10 does not support the operation considering the slice quota and transmit the corresponding field.

In operation 305, the MME 20 may determine whether to allow session creation and access according to a request received from the UE 10 and transmit a Create Session Request message for session creation to the PGW-C/SMF

30. According to an embodiment, the SGW may transfer messages between the MME 20 and the PGW-C.

The Create Session Request message may include information regarding whether the UE 10 supports an operation considering the slice quota, included in the message received from the UE 10. If the message received by the MME 20 from the UE 10 in operation 303 is a PDN connection establishment request message, and a PCO (or ePCO/APCO) is included in the message, it should be inserted in the Create Session Request message.

In operation 307, the PGW-C 30 may determine the capability supported by the UE 10 based on information included in the received Create Session Request message.

If the UE 10 supports the operation considering the slice quota according to the information included in the received Create Session Request message, the PGW-C 30 may perform the operation of explicitly transfer, to the UE, a timer according to the slice quota state, a cause, and slice information, according to an embodiment.

When the UE 10 does not support the operation considering the slice quota according to the information included in the received Create Session Request message, the PGW-C 30 may restrict slice access using NAS level congestion control instead of explicitly transferring, to the UE, the timer according to the slice quota state, cause, and slice information according to an embodiment.

In operation 309, the UE 10, the MME 20, and the PGW-C/SMF 30 may perform the remaining procedures for the attach or PDN connection establishment process.

Figure 4:
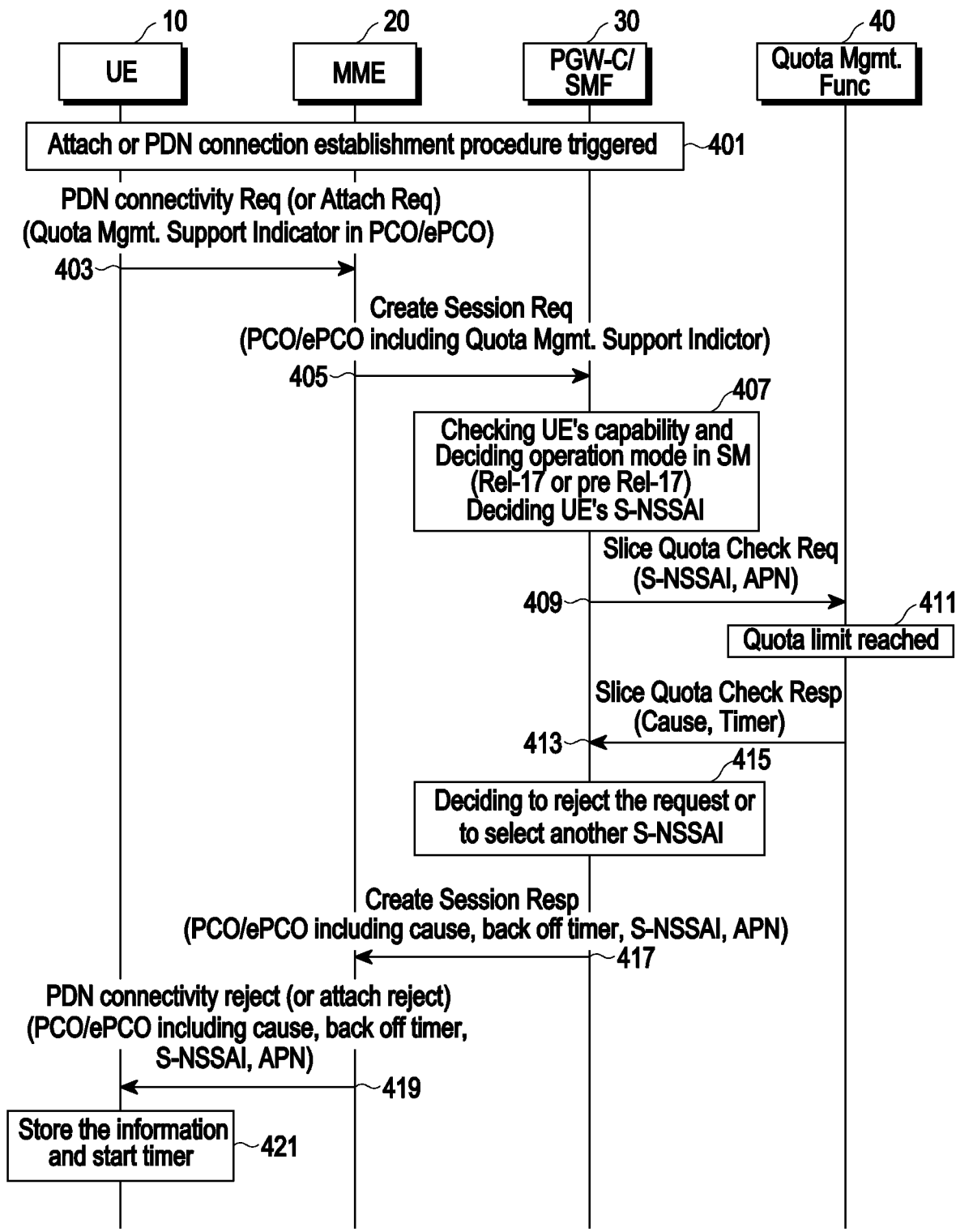
FIG. 4 illustrates operations of a UE and a network according to an embodiment of the disclosure.

FIG. 4 illustrates operations of a UE and a network according to an embodiment of the disclosure.

Referring to FIG. 4, a wireless communication system according to an embodiment may include a UE 10, an MME 20, a PGW-C/SMF 30, and a quota management function (Quota Mgmt Func) 40. Here, the Quota Mgmt Func 40 may mean an NF or NE that manages the quota status of the slice in the network.

Operations 401 to 405 and part of operation 407 are substantially the same as operations 301 to 307 described above with reference to FIG. 3.

In other words, in operation 403, the UE 10 may transmit a request message (PDN connectivity Req (or Attach Req)) for accessing (creating a session or PDN connection) or registering in the 4G network to the MME 20. The request message for creating a new PDN connection may include information indicating that the UE 10 supports an operation considering the slice quota (Quota Mgmt. Support indicator).

In operation 405, the MME 20 may determine whether to allow session creation and access according to a request received from the UE 10 and transmit a Create Session Request message for session creation to the PGW-C/SMF 30. The Create Session Request message may include information indicating that the UE 10 supports an operation considering the slice quota (Quota Mgmt. Support indicator).

Subsequent operations (part of operation 407 to operation 421) of the disclosure may be applied when it is determined that the UE 10 supports the operation considering the slice quota.

In operation 407, the PGW-C 30 may select a slice (S-NSSAI) to proceed with access for the UE 10. If the PGW-C 30 determines that management considering the quota is necessary for the corresponding slice, the PGW-C 30 may identify the quota state of the slice.

If the operation considering the slice quota is possible by the information or configuration inside the PGW-C 30, operations 409 to 413 described below may be performed by the internal operation of the PGW-C 30 without help from a separate NF/NE.

In operation 409, the PGW-C/SMF 30 may transmit the Slice Quota Check Req. message including the selected slice (S-NSSAI) to the Quota Mgmt Func 40. Here, the Quota Mgmt Func 40 may mean an NF or NE that separately manages the quota status of the slice in the network. The Slice Quota Check Req. message may include not only the S-NSSAI, but also the APN to be used by the UE.

In operation 411, the Quota Mgmt Func 40 that manages the quota state may determine that it is impossible to establish a new access UE/session due to the slice quota restriction. The Quota Mgmt Func 40 may also determine whether the cause for the restriction is the number of UEs or the number of sessions.

In operation 413, the Quota Mgmt Func 40 may transfer the cause, indicating that a new connection is impossible due to the slice quota restriction, to the PGW-C 30. Further, the Quota Mgmt Func 40 may transfer a back off timer to be applied for each slice to the PGW-C 30. The cause may indicate whether the cause for the restriction is specifically the number of UEs or the number of sessions.

In operation 415, the PGW-C 30 may determine whether to reject the session create request from the UE 10 or to select another alternative slice (S-NSSAI). If another alternative slice is selected, operations 407 to 413 may be repeatedly performed.

If the session create request from the UE 10 is rejected in operation 415, the PGW-C 30 may transfer a Create Session Response message to the MME 20 through the SGW in operation 417.

The Create Session Response message may include a PCO (or ePCO/APCO) including at least one of information indicating that the session create request of the UE 10 has been rejected and indicating that the cause is the lack due to the slice quota, the back-off timer value to be applied by the UE, the S-NSSAI that cannot be accessed, and the target APN.

In operation 419, the MME 20 may transmit a PDN connectivity reject (or attach reject) message that is a NAS response message transmitted to the UE to the UE 10.

The PDN connectivity reject (or attach reject) message may include a PCO (or ePCO, APCO) transferred by the PGW-C 30. The PCO (or ePCO, APCO) may include one or more of the information indicating that the cause is the lack due to slice quota, a back-off timer value to be applied by the UE, an S-NSSAI that cannot be accessed, and a target APN.

In operation 421, the UE 10 may store information included in the NAS response message received from the MME 20 and may perform access control for the slice using the information included in the NAS response message. When a timer is included in the NAS response message, the UE 10 may start the Timer and delay the NAS request for using the corresponding slice or the corresponding APN until the timer expires.

If the APN is not included in the response, the UE 10 may determine that access to the corresponding APN is rejected if the UE 10 includes the APN in the request message in operation 401. The timer may be maintained and applied even when the UE moves to the 5G network and operates.

If the S-NSSAI is explicitly received in operation 419, the UE 10 may control not to perform a mobility management operation (registration request) in the 5G network associated with the slice.

Figure 5:
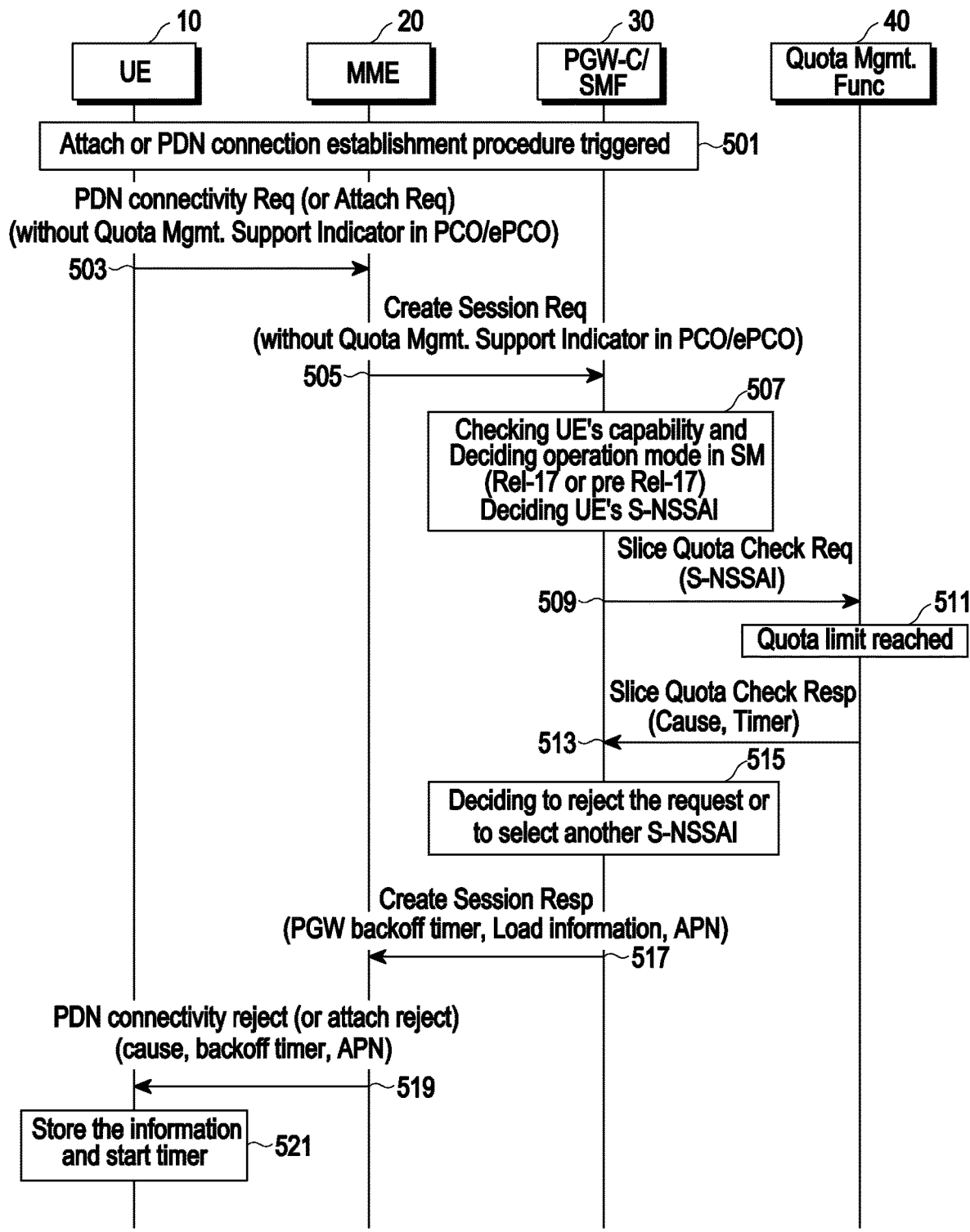
FIG. 5 illustrates operations of a UE and a network according to an embodiment of the disclosure.

FIG. 5 illustrates operations of a UE and a network according to an embodiment of the disclosure.

Referring to FIG. 5, a wireless communication system according to an embodiment may include a UE 10, an MME 20, a PGW-C/SMF 30, and a quota management function (Quota Mgmt Func) 40.

Operations 501 to 505 and part of operation 507 are substantially the same as operations 301 to 307 described above with reference to FIG. 3.

In other words, in operation 503, the UE 10 may transmit a request message (PDN connectivity Req (or Attach Req)) for accessing (creating a session or PDN connection) or registering in the 4G network to the MME 20. The request message for creating a new PDN connection may not include information indicating that the UE 10 supports an operation considering the slice quota (Quota Mgmt. Support indicator).

In operation 505, the MME 20 may determine whether to allow session creation and access according to a request received from the UE 10 and transmit a Create Session Request message for session creation to the PGW-C/SMF 30. The Create Session Request message may not include information indicating that the UE 10 supports an operation considering the slice quota (Quota Mgmt. Support indicator).

Subsequent operations (part of operation 507 to operation 521) of the disclosure may be applied when it is determined that the UE 10 does not support the operation considering the slice quota.

In operation 507, the PGW-C 30 may select a slice (S-NSSAI) to proceed with access for the UE 10. If the PGW-C 30 determines that management considering the quota is necessary for the corresponding slice, the PGW-C 30 may identify the quota state of the slice. If the operation considering the slice quota is possible by the information or configuration inside the PGW-C 30, operations 509 to 513 described below may be performed by the internal operation of the PGW-C 30 without help from a separate NF/NE.

In operation 509, the PGW-C/SMF 30 may transmit the Slice Quota Check Req. message including the selected slice (S-NSSAI) to the Quota Mgmt Func 40. Here, the Quota Mgmt Func 40 may mean an NF or NE that separately manages the quota status of the slice in the network. The Slice Quota Check Req. message may include the S-NSSAI and may include the APN to be used by the UE.

In operation 511, the Quota Mgmt Func 40 that manages the quota state may determine that it is impossible to establish a new access UE/session due to the slice quota restriction.

In operation 513, the Quota Mgmt Func 40 may transfer the cause, indicating that a new connection is impossible due to the slice quota restriction, to the PGW-C 30. Further, the Quota Mgmt Func 40 may transfer a back off timer to be applied for each slice. Further, the Quota Mgmt Func 40 may additionally transfer a value indicating the load state relative to the current quota.

In operation 515, the PGW-C 30 may determine whether to reject the session create request from the UE or to select another alternative slice (S-NSSAI). If another alternative slice is selected, operations 507 to 513 may be repeatedly performed.

If the PGW-C 30 rejects the session create request from the UE 10 in operation 515, the PGW-C 30 may transfer a Create Session Response message to the MME 20 through the SGW in operation 517.

The Create Session Response message may include at least one of the cause for rejection indicating that the session create request from the UE 10 has been rejected, that the PGW is in an overloaded or congested state, or that the network resource is insufficient, the timer value, congestion level information, and one or more target APNs.

In operation 519, the MME 20 may transmit, to the UE 10, a NAS response message (PDN connectivity create response or attach response) according to the Create Session Response message received from the PGW-C 30. The NAS response message may be a PDN connectivity reject (or attach reject) message.

The PDN connectivity reject (or attach reject) message may include at least one of information indicating the cause for rejection, the back-off timer value to be applied by the UE, and the target APN, received in operation 517.

In operation 521, the UE 10 may store information included in the NAS response message received from the MME 20 and may perform access control using the information included in the NAS response message.

When a timer is included in the NAS response message, the UE 10 may start the Timer and delay the NAS request for using the corresponding APN until the timer expires.

If the APN is not included in the response, the UE 10 may determine that access to the corresponding APN is rejected if the UE 10 includes the APN in the request message in operation 501. The timer may be maintained and applied even when the UE moves to the 5G network and operates.

Figure 6:
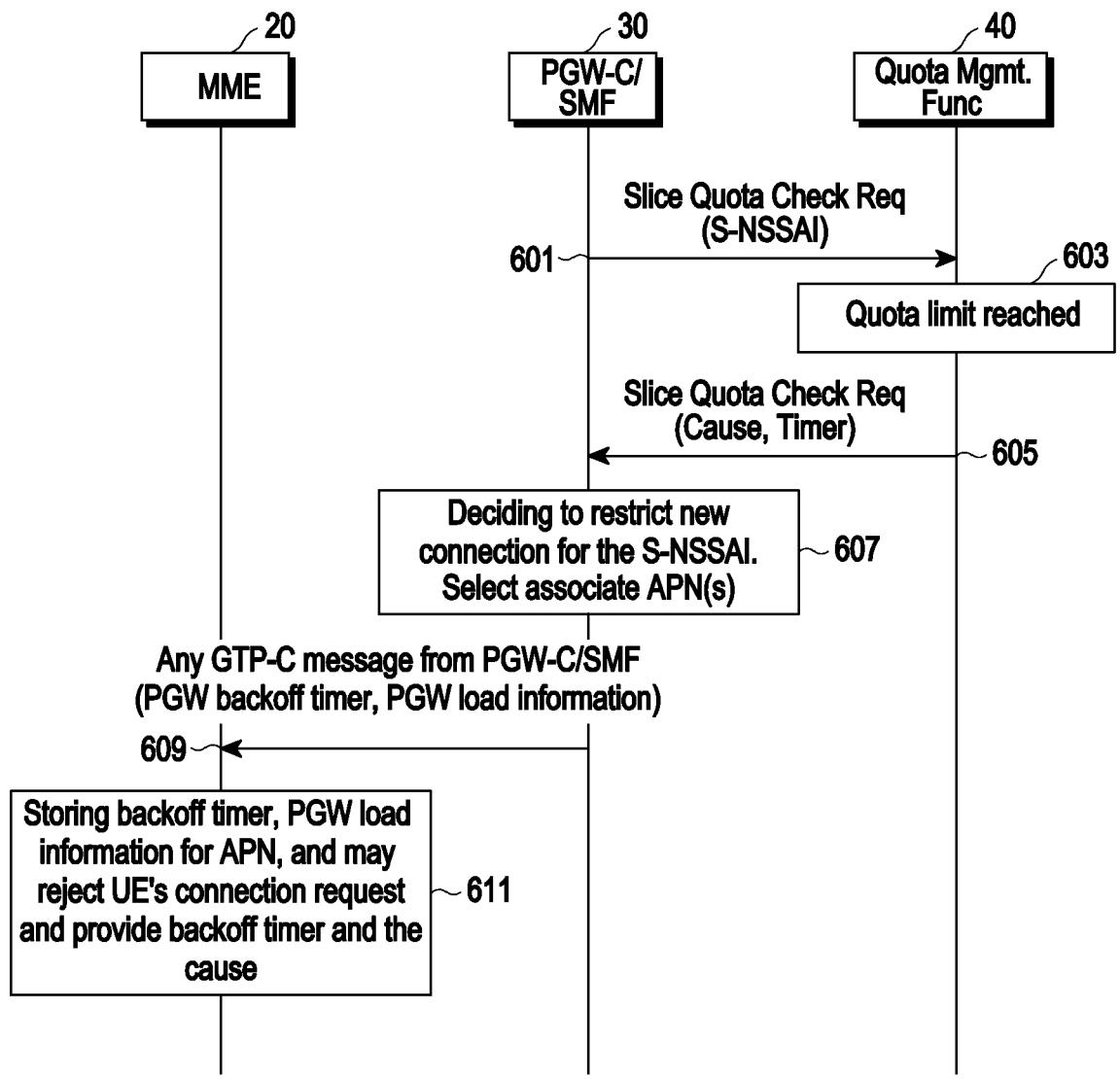
FIG. 6 illustrates operations of a UE and a network according to an embodiment of the disclosure.

FIG. 6 illustrates operations of a UE and a network according to an embodiment of the disclosure.

Referring to FIG. 6, a wireless communication system according to an embodiment may include an MME 20, a PGW-C/SMF 30, and a quota management function (Quota Mgmt Func) 40.

If the PGW-C 30 determines that management considering the quota is necessary for a specific slice, the PGW-C 30 may identify the quota state of the slice. According to an embodiment, If the operation considering the slice quota is possible by the information or configuration inside the PGW-C 30, the operations described below may be performed by the internal operation of the PGW-C 30 without help from a separate NF/NE.

In operation 601, the PGW-C/SMF 30 may transmit the Slice Quota Check Req. message including the selected slice (S-NSSAI) to the Quota Mgmt Func 40. Here, the Quota Mgmt Func 40 may mean an NF or NE that separately manages the quota status of the slice in the network. The Slice Quota Check Req message may include the S-NSSAI and may additionally include the interworking APN.

In operation 603, the Quota Mgmt Func 40 managing the quota state may identify the slice state and may generate a response message based on the result of identification. In operation 603, the Quota Mgmt Func 40 may determine that a new connection is impossible due to the restriction on the slice quota.

In operation 605, the Quota Mgmt Func 40 may transmit a Slice Quota Check Resp message to the PGW-C 30. In this case, the Quota Mgmt Func 40 may transfer, to the PGW-C 30, the cause indicating that a new connection is impossible due to the slice quota restriction. Further, the Quota Mgmt Func 40 may transfer a back off timer to be applied for each slice or APN. Further, the Quota Mgmt Func 40 may additionally transfer a value indicating the load state relative to the current quota.

The Slice Quota Check Resp message of operation 605 may be provided even when an explicit request is not received from the PGW-C 30. If the PGW-C 30 subscribes to the slice state information, it may be provided in the form of a notification.

In operation 607, the PGW-C 30 may determine to limit a new connection for the S-NSSAI and, if it is needed to limit a new connection to a specific slice, may select a target APN.

In operation 609, the PGW-C 30 may transmit a GTP-C message to the MME 20 through the SGW. The GTP-C message may include at least one of information to indicate the current state of the PGW-C 30, the cause indicating that the PGW is in an overloaded or congested state or that the network resource is insufficient, the timer value, congestion level information, and one or more target APNs.

In operation 611, the MME 20 may receive an access request from the UE and, if it is determined that the target PGW-C 30 for the corresponding connection is in a congested state according to the information received in operation 609, the MME 20 may perform the same operation as operation 519 of FIG. 5 and, upon receiving the response message, the UE may perform the same operation as operation 521 of FIG. 5.

In operation 611, the MME 20 may store the backoff timer and PGW load information for the APN, reject the UE's connection request, and provide the backoff timer and cause.

Figure 7:
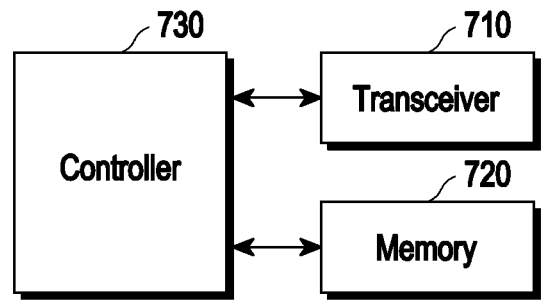
FIG. 7 illustrates a structure of a UE according to an embodiment of the disclosure.

FIG. 7 illustrates a structure of a UE according to an embodiment of the disclosure.

The UE described above in connection with FIGS. 1 to 6 may correspond to the UE of FIG. 7.

Referring to FIG. 7, a UE may include a transceiver 710, a memory 720, and a controller 730. The transceiver 710, controller 730, and memory 720 of the UE may operate according to the above-described communication methods by the UE. However, the components of the UE are not limited thereto. For example, the UE may include more or fewer components than the above-described components. The transceiver 710, the controller 730, and the memory 720 may be implemented in the form of a single chip. The controller 730 may include one or more processors.

The transceiver 710 collectively refers to a transmitter and a receiver of the UE and may transmit and receive signals to/from a base station, network entity, server, or another UE. The signals transmitted and received to/from the base station, network entity, server, or the other UE may include control information and data. To that end, the transceiver 710 may include a radio frequency (RF) transmitter for frequency-up converting and amplifying signals transmitted and an RF receiver for low-noise amplifying signals received and frequency-down converting the frequency of the received signals. However, this is merely an example of the transceiver 710, and the components of the transceiver 710 are not limited to the RF transmitter and the RF receiver.

The transceiver 710 may receive signals via a radio channel, output the signals to the controller 730, and transmit signals output from the controller 730 via a radio channel.

The memory 720 may store programs and data necessary for the operation of the UE. The memory 720 may store control information or data that is included in the signal obtained by the UE. The memory 720 may include a storage medium, such as ROM, RAM, hard disk, CD-ROM, and DVD, or a combination of storage media. Rather than being separately provided, the memory 720 may be embedded in the controller 730.

The controller 730 may control a series of processes for the UE to be able to operate according to the above-described embodiments. For example, the controller 730 may receive a control signal and a data signal through the transceiver 710 and process the received control signal and data signal. The controller 730 may transmit the processed control signal and data signal through the transceiver 710. There may be provided a plurality of controllers 730. The controller 730 may control the components of the UE by executing a program stored in the memory 420.

The controller 730 may control to identify whether the UE supports slice quota-based operation, transmit a packet data network (PDN) connection request message for accessing a 4th-generation (4G) network to an MME based on a result of the identification, and receive, from the MME, a PDN connection reject message configured in response to the PDN connection request message.

According to an embodiment, when the PDN connection request message includes the information indicating that the UE supports the slice quota-based operation, the PDN connection reject message may include at least one of information indicating that a session create request from the UE is rejected, and a cause is a lack due to the slice quota, a back-off timer value to be applied by the UE, inaccessible single network slice selection assistance information (S-NSSAI), and a target access point name (APN).

According to an embodiment, when the PDN connection request message does not include information indicating that the UE supports the slice quota-based operation, the PDN connection reject message includes at least one of information indicating that a session create request from the UE is rejected, and a cause is a congested state of a PGW, a timer value, congestion level information, and one or more target APNs.

Figure 8:
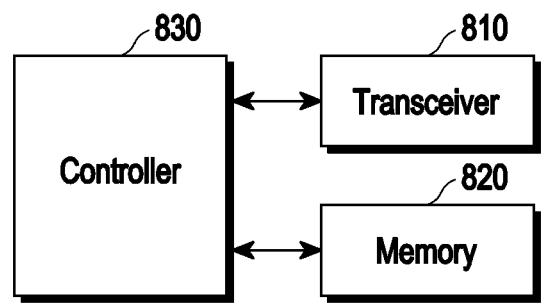
FIG. 8 illustrates a structure of a network entity according to an embodiment of the disclosure.

FIG. 8 illustrates a structure of a network entity according to an embodiment of the disclosure.

Each of the network entities described with reference to FIGS. 1 to 6 may include the components of FIG. 8. In particular, each of the UE 10, MME 20, PGW-C 30, and Quota Management Function (Quota Mgmt Func) 40 illustrated in FIGS. 3 to 6 may be implemented to include the components of FIG. 8.

Referring to FIG. 8, a network entity according to an embodiment may include a transceiver 810, a memory 820, and a controller 830. The transceiver 810, controller 830, and memory 820 of the network entity may operate according to the above-described communication methods by the network entity.

However, the components of the network entity are not limited thereto. For example, the network entity may include more or fewer components than the above-described components. The transceiver 810, the controller 830, and the memory 820 may be implemented in the form of a single chip. The controller 830 may include one or more processors.

The transceiver 810 collectively refers to a transmitter and a receiver and may transmit and receive signals to/from a base station, UE, network entity, or server. The signals transmitted and received to/from the base station, the UE, the network entity, or the server may include control information and data. To that end, the transceiver 810 may include a radio frequency (RF) transmitter for frequency-up converting and amplifying signals transmitted and an RF receiver for low-noise amplifying signals received and frequency-down converting the frequency of the received signals. However, this is merely an example of the transceiver 810, and the components of the transceiver 810 are not limited to the RF transmitter and the RF receiver.

The transceiver 810 may receive signals via a radio channel, output the signals to the controller 830, and transmit signals output from the controller 830 via a radio channel.

The memory 820 may store programs and data necessary for the operation of the network entity or server. The memory 820 may store control information or data that is included in the signal obtained by the network entity or server. The memory 820 may include a storage medium, such as ROM, RAM, hard disk, CD-ROM, and DVD, or a combination of storage media. Rather than being separately provided, the memory 820 may be embedded in the controller 830.

The controller 830 may control a series of operations to allow the network entity or server to operate as per the above-described embodiments. For example, the controller 830 may receive a control signal and a data signal through the transceiver 810 and process the received control signal and data signal. The controller 830 may transmit the processed control signal and data signal through the transceiver 810. There may be provided a plurality of controllers 830. The controller 830 may control the components of the network entity by executing a program stored in the memory 820.

According to an embodiment, a controller 830 implemented in a packet data network gateway control plane (PGW-C) may control to receive a session create request message from an MME, identify whether information indicating that a UE supports a slice quota-based operation is included in the session create request message, and transmit, to the MME, a session create response message configured based on a result of the identification.

According to an embodiment, when the session create request message includes the information indicating that the UE supports the slice quota-based operation, the session create response message may include at least one of information indicating that a session create request from the UE is rejected, and a cause is a lack due to the slice quota, a back-off timer value to be applied by the UE, inaccessible single network slice selection assistance information (S-NS-SAI), and a target access point name (APN).

According to an embodiment, when the session create request message does not include the information indicating that the UE supports the slice quota-based operation, the session create response message may include at least one of information indicating that a session create request from the UE is rejected, and a cause is a congested state of a PGW, a timer value, congestion level information, and one or more target APNs.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, ROMs, electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise. Further, it should also be noted that in some replacement execution examples, the functions mentioned in the blocks may occur in different orders. For example, two blocks that are consecutively shown may be performed substantially simultaneously or in a reverse order depending on corresponding functions.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for processing a network slice by a session management function and packet data network gateway control plane (SMF+PGW-C) in a wireless communication system, the method comprising:
    identifying that a network slice admission control associated with a slice quota is supported, wherein the slice quota includes at least one of a maximum number of user equipments (UEs) per network slice in evolved packet core (EPC) and a maximum number of protocol data unit (PDU) sessions per network slice in the EPC;
    selecting, by the SMF+PGW-C, a single network slice selection assistance information (S-NSSAI) associated with a packet data network (PDN) connection in the EPC, wherein the network slice is identified by the S-NSSAI; and
    transmitting, by the SMF+PGW-C to a network slice control function, a first message to check an availability of the network slice.

2. The method of claim 1, further comprising:
    transmitting, to a mobility management entity (MME), a session create response message in response to a session create request message including information indicating that a UE supports a slice quota-based operation,
    wherein the session create response message comprises at least one of information indicating that a session create request from the UE is rejected and a cause is a lack due to a slice quota, a back-off timer value to be applied by the UE, inaccessible single network slice selection assistance information (S-NSSAI), or a target access point name (APN).

3. The method of claim 1, further comprising:
    transmitting, to a mobility management entity (MME), a session create response message in response to a session create request message not including information indicating that a UE supports a slice quota-based operation, wherein the session create response message comprises at least one of information indicating that a session create request from the UE is rejected and a cause is a congested state of a packet data network gateway (PGW), a timer value, congestion level information, or one or more target access point names (APNs).

4. The method of claim 1, further comprising:
receiving, from the network slice control function, a second message associated with the availability of the network slice in response to the first message.

5. The method of claim 4, further comprising:
rejecting the PDN connection based on cause being a number of UEs in the network slice has been exceeded in response to the second message; and
identifying another S-NSSAI for the PDN connection.

6. A session management function and packet data network gateway control plane (SMF+PGW-C) configured to process a network slice in a wireless communication system, the SMF+PGW-C comprising:
a transceiver; and
a processor coupled with the transceiver and configured to control to:
identify that a network slice admission control associated with a slice quota is supported, wherein the slice quota includes at least one of a maximum number of user equipments (UEs) per network slice in evolved packet core (EPC) and a maximum number of protocol data unit (PDU) sessions per network slice in the EPC,
select a single network slice selection assistance information (S-NSSAI) associated with a packet data network (PDN) connection in the EPC, wherein the network slice is identified by the S-NSSAI, and
transmit, to a network slice control function, a first message to check an availability of the network slice.

7. The SMF+PGW-C of claim 6,
wherein the processor is further configured to control to:
transmit, to a mobility management entity (MME), a session create response message in response to a session create request message including information indicating that a UE supports a slice quota-based operation, and
wherein the session create response message comprises at least one of information indicating that a session create request from the UE is rejected and a cause is a lack due to a slice quota, a back-off timer value to be applied by the UE, inaccessible single network slice selection assistance information (S-NSSAI), or a target access point name (APN).

8. The SMF+PGW-C of claim 6,
wherein the processor is further configured to control to:
transmit, to a mobility management entity (MME), a session create response message in response to a session create request message not including information indicating that a UE supports a slice quota-based operation, and
wherein the session create response message comprises at least one of information indicating that a session create request from the UE is rejected and a cause is a congested state of a packet data network gateway (PGW), a timer value, congestion level information, or one or more target access point names (APNs).

9. The SMF+PGW-C of claim 6, wherein the processor is further configured to:
receive, from the network slice control function, a second message associated with the availability of the network slice in response to the first message.

10. The SMF+PGW-C of claim 9, wherein the processor is further configured to:
reject the PDN connection based on cause being a number of UEs in the network slice has been exceeded in response to the second message; and
identify another S-NSSAI for the PDN connection.

* * * * *